April 13, 1965 P. A. WILKS, JR 3,177,759
APPARATUS FOR THE SPECTRUM EXAMINATION OF MATERIALS
Filed Oct. 4, 1961

INVENTOR.
PAUL A. WILKS JR.
BY
Robertson & Smythe
ATTORNEYS

United States Patent Office 3,177,759
Patented Apr. 13, 1965

3,177,759
APPARATUS FOR THE SPECTRUM EXAMINATION
OF MATERIALS
Paul A. Wilks, Jr., Darien, Conn., assignor, by mesne assignments, to Barnes Engineering Company, Stamford, Conn., a corporation of Delaware
Filed Oct. 4, 1961, Ser. No. 142,924
4 Claims. (Cl. 88—14)

The present invention relates to the art of spectrum examination of materials, and particularly to a new and improved attenuating total reflecting plate for use in such examinations.

The principles of attenuating total reflection may be understood by considering a beam of radiation that is passed into a prism so that it is totally reflected from the back face of the prism. It has been shown that some portion of the energy of the beam escapes from the totally reflecting face and then is returned into the prism. It is almost as though the ray had a wave front of a finite width.

It appears that if an absorbing material is placed in contact with the reflecting surface, the energy that escapes temporarily from the prism is selectively absorbed, much as in a transmission spectrum. The absorption-like spectra obtained by this method have two important and unique features: (1) the band intensities are the equivalent of an extremely shallow (5 microns or less) penetration into the sample; and (2) these band intensities are completely independent of the sample thickness.

Attenuating total reflecting systems have been developed and they have embodied relatively large amounts of expensive crystals. Additionally, with the exception of zinc sulfide sold under the trademark "Irtran–2," most of the crystalline materials are soft and subject to damage by repeated use.

It is an object of this invention to provide an apparatus for the spectrum examination of materials which includes an attenuated total reflection plate that is inexpensive and yet effective.

Another object of the invention is to provide such an apparatus having an attenuated total reflection plate that is relatively thin and requires a small amount of crystalline material.

In one aspect of the invention, one face is undulated so that it presents a surface approximately perpendicular to the incoming beam and a back face which is substantially optically flat. Such a combination of surfaces permits the beam to come through the front surface and to be reflected from the back surface as set forth herein.

In another aspect of the invention, an attenuating total reflecting plate may be formed from a radiant energy transmitting material capable of transmitting infrared, visible and ultraviolet rays. Such materials as salts, including the alkali halides, zinc sulfide and even quartz, glass and transparent plastics such as methyl methacrylate may be used as the base material.

In another aspect of the invention, one surface of a sheet of said material may be optically flat while the opposite surface may be undulated. While the softer materials such as silver chloride, zinc sulfide and the transparent plastics may be formed by impressing a die having the desired undulated surface therein onto a sheet of said material, the harder materials may be machined by any of several processes including ultrasonic machining.

In another aspect of the invention, the formed crystalline material may be mounted on a sample of material to be analyzed in a manner to make contact between the sample and the optically flat surface opposite the undulated surface of the plate.

The sample supporting the attenuating total reflecting plate may then be subjected to radiant energy which passes through the undulated surface of the attenuating total reflecting plate, and a portion of the radiant energy is reflected from the optical interface between the plate and sample into a spectroscope.

The above, other objects and novel features of the invention will become apparent from the following specification and accompanying drawings which are merely examplary.

Figure 1:
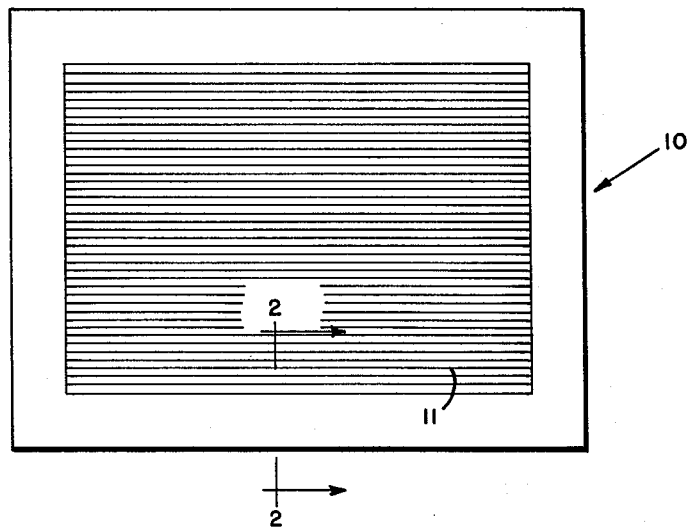
FIG. 1 is a plan view of a sheet of material to which the principles of the invention have been applied.

Referring to the drawings, the principles of the invention have been shown as applied to a sheet 10 of crystalline material that may be formed from a salt such as zinc sulfide or thallium bromide iodide, or one of the alkali halides such as silver chloride, sodium chloride, potassium bromide, calcium fluoride, barium fluoride or cesium fluoride, or one of the transparent plastics such as methyl methacrylate, or even quartz or glass. A die having an undulating bottom surface, which may be formed of closely spaced grooves having prismatic or semicircular contours, may be forced onto such crystalline sheet materials that may be sufficiently soft, thereby forming an undulated surface 11 on one face thereof, which undulations may be of prismatic or half-cylinder form. In the use of the harder radiant energy transmitting materials, the undulated surface may be formed by various machining processes including ultrasonic vibration machining.

The surface 12 of the crystalline sheet 10 preferably is optically flat, and on it may be deposited or supported a sample 17 of which the optical characteristics are to be analyzed. As one example, the thickness of the crystalline sheet 10 may be in the order of about 0.020 inch and the approximate pitch of the undulations may be in the order of about 0.040 inch. As another example, the radius of the half-cylindrical undulations shown in FIG. 3 may be in the order of about 0.020 inch. The distance from the bottom of the undulations in the above example to the optically flat surface may be in the order of about 0.005 inch. The undulated sheet is quite thin, which serves to save material. It is to be understood that these dimensions may be changed as needed.

Figure 3:
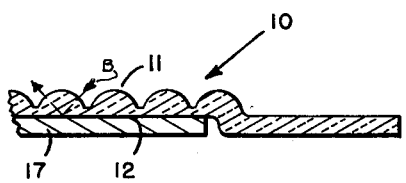
FIG. 3 is an enlarged sectional view, similar to FIG. 2, of a modified form of the invention.
Figure 2:
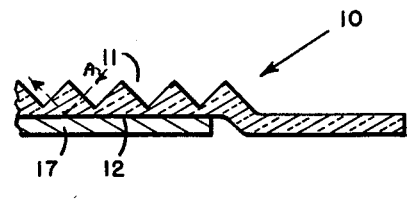
FIG. 2 is an enlarged sectional view taken substantially along line 2—2 of FIG. 1.

The rays A and B in FIGS. 2 and 3, respectively, are substantially perpendicular to the portion of the surface receiving the same.

Figure 4:
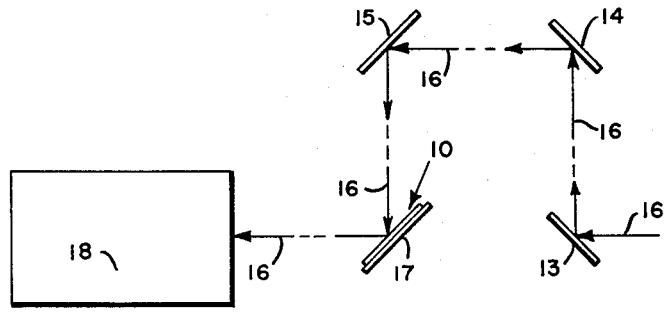
FIG. 4 is a schematic showing of a system within which the crystalline material of FIG. 1 is used.

Referring to FIG. 4, reflecting surfaces or mirrors 13, 14 and 15 may be arranged to cause rays of radiant energy 16 to be directed onto the undulated surface of the plate 10, on the back or optically flat surface 12 of which a sample 17 to be analyzed may be deposited or supported. The reflected rays 16 from the plate 10 are directed into a spectrometer 18 for determining the optical characteristics of the sample 17.

Although the various features of the new and improved attenuating total reflecting plate have been shown and described in detail to fully disclose an embodiment of the invention, it will be evident that changes may be made in such details and certain features may be used without others without departing from the principles of the invention.

What is claimed is:

1. An apparatus for spectrum examination of materials comprising in combination (a) a relatively thin, unitary, attenuated total reflection plate of an infrared transmitting material having two spaced opposing surfaces, one of said surfaces being optically flat and the other of said surfaces having formed thereon a repetitive series of longitudinally contiguous, parallel, triangular prismatic surfaces, (b) a sample whose spectral characteristics are to be examined, positioned in contact with the optically flat surface of said plate, (c) means for applying radiation directly on the prismatic surface of said plate at an angle which produces attenuated total reflected radiation from the optically flat surface, and (d) utilization means positioned for receiving and spectrally analyzing the attenuated total reflected radiation from said plate.

2. An apparatus for spectrum examination of materials comprising in combination (a) a relativetly thin, unitary, attenuated total reflection plate of an infrared transmitting material having two spaced opposing surfaces, one of said surfaces being optically flat and the other of said surfaces having formed thereon a repetitive series of longitudinally contiguous, parallel, half-cylindrical surfaces, (b) a sample whose spectral characteristics are to be examined, positioned in contact with the optically flat surface of said plate, (c) means for applying radiation directly on the half-cylindrical surface of said plate at an angle which produces attenuated total reflected radiation from the optically flat surface, and (d) utilization means positioned for receiving and spectrally analyzing the attenuated total reflected radiation from said plate.

3. The apparatus set forth in claim 1 wherein said infrared transmitting material is silver chloride.

4. The apparatus set forth in claim 2 wherein said infrared transmitting material is silver chloride.

References Cited by the Examiner

UNITED STATES PATENTS

| | | | |
|---|---|---|---|
| 1,484,287 | 2/24 | Bailey | 88—106 X |
| 2,964,636 | 12/60 | Cary. | |
| 3,062,103 | 11/62 | Bolz | 88—61 X |

OTHER REFERENCES

Fahrenfort; "Attenuated Total Reflection," Spectrochemica Acta, vol. 17, No. 7, August 1961, pages 698–709.

Harrick: "Surface Chemistry from Spectral Analysis of Totally Internally Reflected Radiation," J. Phys. Chem., vol. 34, September 1960, pages 1100–1114.

Rosenthal: Journal of the Optical Society of America, vol. 20, No. 3, March 1930, pages 87–96.

JEWELL H. PEDERSEN, *Primary Examiner.*